United States Patent
Malaprade et al.

(10) Patent No.: US 11,010,809 B2
(45) Date of Patent: May 18, 2021

(54) ADVANCED TECHNIQUES FOR IMPROVED PRODUCT PHOTOGRAPHY, INTERACTIVITY, AND INFORMATION DISTRIBUTION

(71) Applicant: L'Oreal, Paris (FR)

(72) Inventors: Helga Malaprade, Saint-Ouen (FR); Grégoire Charraud, Saint-Ouen (FR)

(73) Assignee: L'Oreal, Paris (FR)

( * ) Notice: Subject to any disclaimer, the term of this patent is extended or adjusted under 35 U.S.C. 154(b) by 97 days.

(21) Appl. No.: 16/129,615

(22) Filed: Sep. 12, 2018

(65) Prior Publication Data
US 2020/0082452 A1    Mar. 12, 2020

(51) Int. Cl.
*G06Q 30/06* (2012.01)
*G06K 7/10* (2006.01)
*G06K 7/14* (2006.01)

(52) U.S. Cl.
CPC ..... *G06Q 30/0623* (2013.01); *G06K 7/10386* (2013.01); *G06K 7/1417* (2013.01)

(58) Field of Classification Search
CPC ........... G06Q 30/0623; G06K 7/10386; G06K 7/1417
USPC ...................................... 705/26.61
See application file for complete search history.

(56) References Cited

U.S. PATENT DOCUMENTS

| | | | | |
|---|---|---|---|---|
| 6,628,829 | B1 * | 9/2003 | Chasen ...................... | G01J 3/46 382/165 |
| 6,807,297 | B1 * | 10/2004 | Tankovich ........... | A45D 44/005 382/100 |
| 7,051,935 | B2 * | 5/2006 | Sali ......................... | G06K 7/14 235/462.04 |
| 7,856,118 | B2 * | 12/2010 | Kalla ....................... | G01J 3/50 382/100 |

(Continued)

OTHER PUBLICATIONS

Bhatti et al, Mobile Cosmetics Advisor: An Imaging Based Mobile Service, 2010, Proc. of SPIE-IS&T Electronic Imaging, SPIE vol. 7542, 754205 , (Year: 2010).*

(Continued)

*Primary Examiner* — Marissa Thein
*Assistant Examiner* — Thomas Joseph Sullivan
(74) *Attorney, Agent, or Firm* — Christensen O'Connor Johnson Kindness PLLC (57) ABSTRACT

A computing device obtains a digital image of a color calibration target for a product; obtains product information for the product; determines image adjustment information based on the digital image of the color calibration target; obtains a digital image of the product based on the image adjustment information; and transmits the image data of the product and the product information to a backend product computer system. Obtaining the product information for the product may include scanning a graphical code, such as a QR code or a bar code, or obtaining information from the product via short-range radio-frequency communication. The method may further include receiving a response from (Continued)

the backend product computer system, which may include additional product information. The color calibration target and encoded product information may be included in a QR code having three or more color regions.

21 Claims, 4 Drawing Sheets
(1 of 4 Drawing Sheet(s) Filed in Color)

(56) References Cited

U.S. PATENT DOCUMENTS

| | | | | |
|---|---|---|---|---|
| 8,982,177 | B2* | 3/2015 | Modai | H04N 7/147 348/14.08 |
| 2006/0129411 | A1* | 6/2006 | Bhatti | G06Q 30/02 705/346 |
| 2010/0174599 | A1* | 7/2010 | Rosenblatt | G06Q 30/02 705/14.37 |
| 2016/0026866 | A1* | 1/2016 | Sundaresan | G06F 16/9535 705/26.7 |
| 2017/0272741 | A1* | 9/2017 | Maltz | H04N 17/002 |
| 2018/0068466 | A1 | 3/2018 | Bronkalla | |
| 2018/0075523 | A1 | 3/2018 | Sartori Odizzio et al. | |
| 2018/0158212 | A1 | 6/2018 | Ghazizadeh | |

OTHER PUBLICATIONS

"QR code," Wikipedia, The Free Encyclopedia, Jun. 19, 2018, <https://en.wikipedia.org/wiki/QR_code> [retrieved Jun. 19, 2018], 18 pages.

International Search Report and Written Opinion dated Dec. 6, 2019, issued in corresponding International Application No. PCT/EP2019/074233, filed Sep. 11, 2019, 14 pages.

\* cited by examiner

ADVANCED TECHNIQUES FOR IMPROVED PRODUCT PHOTOGRAPHY, INTERACTIVITY, AND INFORMATION DISTRIBUTION

SUMMARY

In some embodiments, a computing device performs a method in which the computing device obtains a digital image of a color calibration target for a product; obtains product information for the product; determines image adjustment information based at least in part on the digital image of the color calibration target; obtains a digital image of the product based at least in part on the image adjustment information; and transmits the image data of the product and the product information to a backend product computer system. The color calibration target may include a color checker chart or gray card. Obtaining the product information for the product may include scanning a graphical code, such as a QR code or a bar code, or obtaining information from the product via short-range radio-frequency communication. The method may further include receiving a response from the backend product computer system. The response may include additional product information.

In an embodiment, the color calibration target comprises a QR code having three or more color regions. Determining the image adjustment information may include comparing pixel values in the color regions (which may be at predetermined locations and/or in distinctively shaped regions within the QR code) with expected pixel values and adjusting one or more image capture parameters based on the comparisons. Obtaining the product information for the product may include extracting the product information from the QR code.

In an embodiment, obtaining the digital image of the product based at least in part on the image adjustment information includes adjusting one or more image capture parameters based at least in part on the image adjustment information; and capturing the digital image of the product using the adjusted image capture parameters.

In an embodiment, the product is a cosmetics product, and wherein the product information includes batch characterization information for the cosmetics product.

Further embodiments include illustrative computing devices, computer systems, manufacturing systems, and computer-readable media.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing aspects and many of the attendant advantages of this invention will become more readily appreciated as the same become better understood by reference to the following detailed description, when taken in conjunction with the accompanying drawings, wherein.

DETAILED DESCRIPTION

The process of effectively matching a personal care product such as lip gloss, lipstick, or makeup to a particular consumer is a complicated one. Even if a consumer is provided with an educated recommendation as to whether a product of a particular color is appropriate for her skin tone, that recommendation is based on what that color of the product is intended to be (e.g., based on a name or other identifier of the product), as opposed to the actual characteristics of the particular product that the consumer intends to buy, including any variations that may have occurred during the manufacturing process. Cosmetics manufacturing processes are very sensitive to variations in raw materials and pigment dispersion from one batch to another, resulting in unpredictable variations in color, texture and other properties of finished products.

Although a consumer may in some situations be able to inspect the actual product before she purchases it, the consumer's view of the product will be highly dependent on lighting and other environmental conditions. Furthermore, a visual inspection of the product is insufficient to detect any variations in the actual color of the product compared to the expected color. Additional problems occur with virtual "try on" applications that attempt to provide the consumer with the experience of trying on different shades or textures. Such applications may allow a consumer to virtually apply a product such as lipstick to a photo, but these applications can be problematic. As one example, such applications are again based on what the color of the product is intended to be, rather than the color of the particular product that the consumer will actually be using, with corresponding variations that may have occurred during the manufacturing process.

Figure 1:
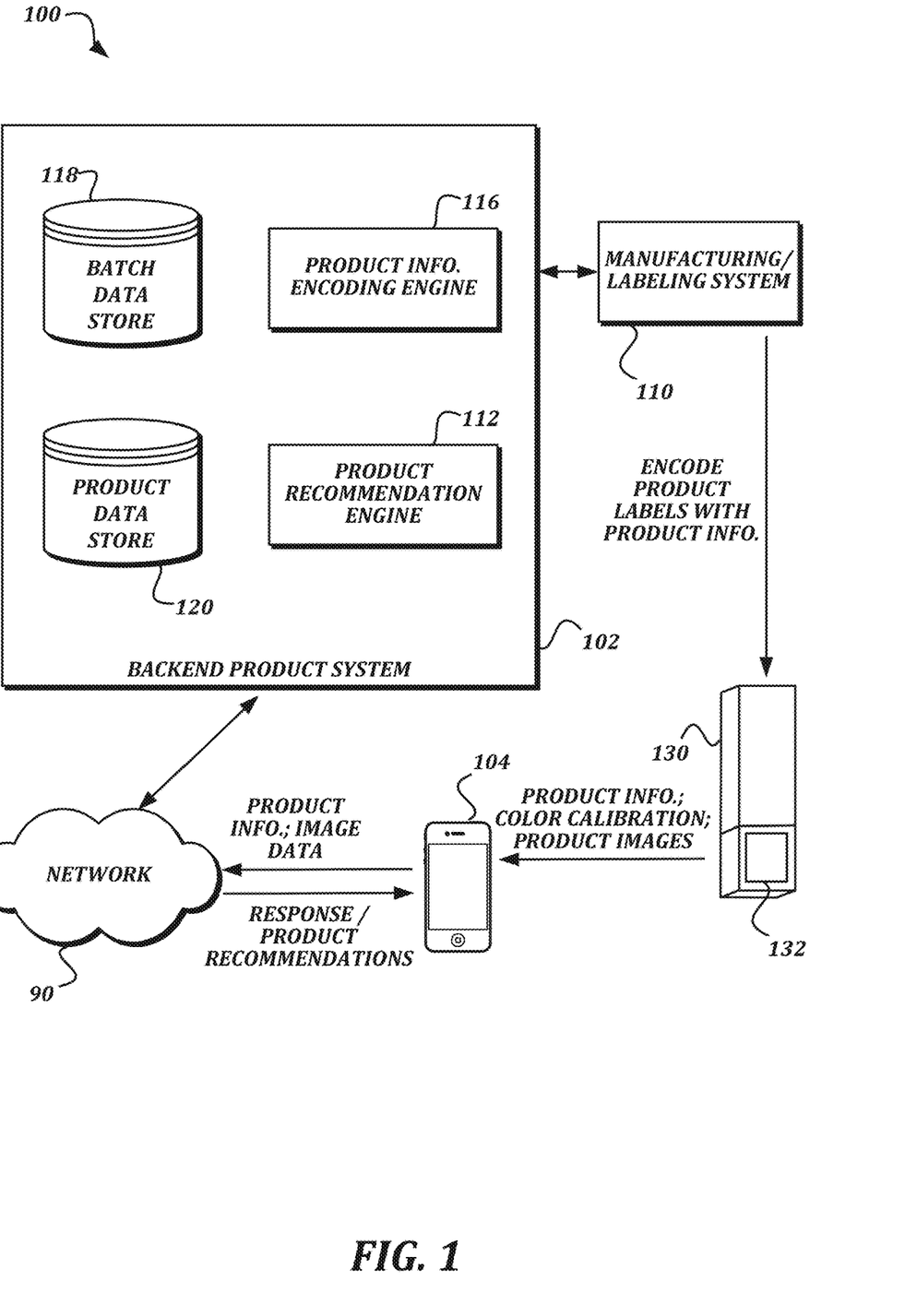
FIG. 1 is a schematic diagram that provides a high-level overview of example functionality of various embodiments of the present disclosure.

FIG. 1 is a block diagram that illustrates an example embodiment of a system according to various aspects of the present disclosure that help solve these problems, while also providing technical benefits described in more detail below. As shown, a system 100 includes components that allow an end user to obtain customized product information in response to color calibrated product images. In an embodiment, the system 100 comprises a system for encoding personal care products (e.g., cosmetics, nail care products, and the like) with information that can be decoded and used by consumers. For example, consumers can use the system 100 to obtain customized product information for personal care products that may be available in a variety of colors, textures, and the like. Non-limiting examples of such products include eye liners, lip glosses, lipsticks, makeup, and nail polish. Such products may have intended variations in color, texture, or other characteristics, as well as unintended variations that occur during or after manufacturing. Described embodiments allow end users to obtain product identification and batch information (e.g., color, texture, formula, sourcing information, and the like) as well as accurate images of the actual product, to assist in matching a consumer with a product that is appropriate for that consumer, thereby enhancing the consumer's experience.

The system 100 may be suitable for implementing actions such as obtaining product information for a product (e.g., product identifiers, batch information, etc.); determining image adjustment information based at least in part on a digital image of a color calibration target for the product; obtaining a digital image of the product based at least in part on the image adjustment information; receiving the image data of the product and the product information at a backend product computer system; and providing a response (e.g., additional product information, product recommendations, and the like) from the backend product computer system. Though some aspects are illustrated and described as relating to personal care products to succinctly describe one embodiment of the present disclosure, in some embodiments, products other than personal care products may be processed by the system 100.

As shown, the system 100 includes a backend product computer system 102, a client computing device 104 (e.g., a smart phone, tablet computer, etc.), and a manufacturing and labeling system 110. Each of these components may communicate with each other via a network 90, which may include any suitable communication technology including but not limited to wired technologies such as DSL, Ethernet, fiber optic, USB, and Firewire; wireless technologies such as WiFi, WiMAX, 3G, 4G, LTE, and Bluetooth; and the Internet.

In some embodiments, the client computing device 104 may be used by a user to interact with other components of the system 100. Typically, the client computing device 104 is a mobile computing device such as a smart phone or a tablet computing device. However, any other suitable type of computing device capable of communicating via the network 90 and presenting a user interface, including but not limited to a desktop computing device, a laptop computing device, and a smart watch, may be used.

In some embodiments, the backend product computer system 102 is configured to receive information from manufacturing and labeling system 110 and to use the received information to characterize particular batches of a manufactured product. For example, batches may be inspected and/or automatically analyzed in the factory tank after mixing for color and texture characteristics, or raw materials may be inspected and/or automatically analyzed prior to mixing. In some embodiments, the backend product computer system 102 transmits instructions to the manufacturing and labeling system 110 to cause selected products to be encoded (e.g., using graphical codes such as QR codes or bar codes) with product information such as product identifiers, batch information (e.g., color information, texture information, raw material component/formula information, etc.), raw material sourcing and traceability information, sustainability and environmental information, and the like. This information can be subsequently decoded by consumers or by other entities, such as researchers, engineers, or quality control technicians, to obtain information about the batch from which the end product was made. The backend product computer system 102 is illustrated as communicating directly with the manufacturing and labeling system 110, which may occur using any suitable wired or wireless technology, though in some embodiments, such communication may occur via the network 90.

As illustrated, the backend product computer system 102 includes a recommendation engine 112, a product information encoding engine 116, a product data store 120, and a batch data store 118. In some embodiments, the recommendation engine 112 receives product information from the product data store 120 along with information from the client computing device 104, and uses this information to generate product recommendations. For example, the client computing device 104 may provide product information and product image data obtained from a product 130 (e.g., a cosmetics product such as lipstick, lip gloss, eye shadow, foundation, or the like). The recommendation engine 112 may, in response, use this information to develop or obtain additional product information or recommendations (e.g., other products, other shades or styles of a similar product, etc.) to provide to the client computing device. In an embodiment, the client computing device 104 obtains the product information by decoding information encoded on or in the product (e.g., in a graphical code 132 such as a bar code or QR code, or in a near-field communication (NFC) or radio-frequency identification (RFID) chip) and obtains image data by capturing a color-calibrated image of the product. Techniques that may be employed by the client computing device 104 to obtain and provide such information to the backend product computer system 102 are described in further detail below.

In some embodiments, the product information encoding engine 116 receives product information from the product data store 120 and the batch data store 118 and uses this information to provide encoding instructions to the manufacturing and labeling system 110. For example, during a first stage of a manufacturing process, the manufacturing and labeling system 110 may prepare a batch of product using a particular mix of ingredients. The components of this mix may be recorded and quantified, and this information may be stored and associated with an identifier for particular batch in the batch data store 118. In a second stage, the product information encoding engine 116 may send commands to the manufacturing and labeling system 110 that cause the system 110 to encode such information on the product (e.g., in a bar code or QR code).

Although the system 110 is illustrated as a combined manufacturing and labeling system for ease of illustration, it should be understood that manufacturing, labeling, packaging, or other functionality may be provided in separate systems or subsystems. In addition, while the term "labeling" is used herein to describe an illustrative process in which information is encoded on labels that may be affixed to a product 130 or packaging of a product, it should be understood that actual labels are not required and may instead be replaced with direct printing or etching on the product 130, or with digital encoding of information on electronic components (e.g., NFC or RFID chips) in or on the product or packaging.

Figure 2:
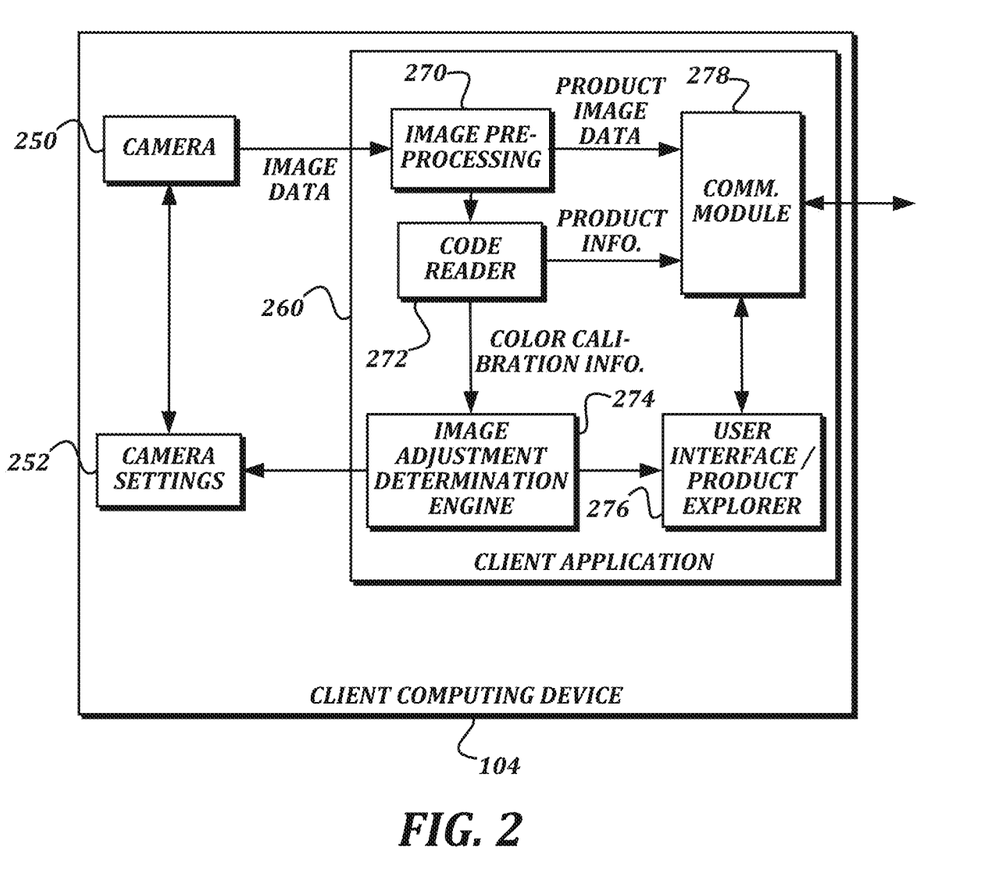
FIG. 2 is a block diagram that illustrates an example embodiment of a client computing device according to various aspects of the present disclosure.

FIG. 2 is a block diagram that illustrates an example embodiment of a client computing device 104 according to various aspects of the present disclosure. In the example shown in FIG. 2, the client computing device 104 includes a camera 250 and a client application 260. The client application 260 includes a user interface 276, which may include interactive functionality such as guides, tutorials, virtual "try-on" functionality, or product exploration technology. This technology may, in some embodiments, allow consumers to try different looks, perform color matching, compare products with other products, test variations in characteristics such as coverage, color, finish, etc. In an embodiment, the highly accurate imaging and analysis of the product allows improved product recommendations (e.g., matching customer's lipstick to recommended eye shadow, blush, etc.), color matching for discontinued products, variations in products (e.g., find a precisely matching color with different finish, coverage, etc.), and the like. In an embodiment, the user interface and related technology is provided on a consumer's computing device (e.g., smart phone, tablet computer, etc.) Alternatively, described functionality such as virtual try-on, recommendations, and the like can be provided on some other computing device, such as a device with a larger screen at the point of sale.

In an embodiment, a user captures an image of a graphical code 132 on the product 130 using the camera 250. The camera provides image data to the client application 260, which performs image preprocessing 270 to determine how the image data should be processed. In an embodiment, the image data is determined to include both product information and color calibration information. In an embodiment, this information is encoded together in a QR code. Alternatively, this information can be provided separately, or in some other medium.

Figure 3:
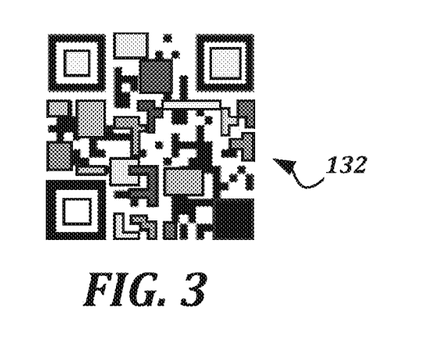
FIG. 3 is a diagram of a QR code comprising a color calibration target in the form of color regions according to various aspects of the present disclosure.

FIG. 3 is a diagram of a QR code 132 comprising a color calibration target according to various aspects of the present disclosure. In this example, the color calibration target feature of the QR code includes several color regions in predetermined locations within the QR code. In this example, the colors in the QR code match those that would be present in a color checker chart for color calibration in photography. However, it should be understood that fewer or additional colors could also be used depending on factors such as desired level of accuracy, color of the product, etc. In an embodiment, the QR code includes three (e.g., white, black, gray) or more colors. Because the location of each color is known, the client application 260 can analyze the image data at those locations to determine whether the camera 250 is accurately capturing those colors, or whether some adjustments may be needed.

In addition to, or as an alternative to predetermined location, these color regions may be distinguished by shapes that can be recognized by the image adjustment determination engine 274 as corresponding to a particular color or shade of gray. As an example, as shown in FIG. 3, the shapes of the blue regions are distinct from the shape of the yellow and red regions. Many other sizes, shapes, positions, and arrangements of color regions relative to one another also can be used.

In an embodiment, the color regions can serve the purpose of providing color calibration information to the image adjustment determination engine 274, while also being interpreted as embellishments that can be ignored (e.g., using appropriate error correction or filtering mechanisms) for the purpose of extraction of text information by the code reader 272. In this way, the color regions can be added within the boundaries of the QR code 132 to provide color calibration functionality without interfering with the ability of the QR code 132 to encode product information. The amount of text information provided by the code may vary based on, e.g., the dimensions/resolution of the QR code, the number of bits per character, error correction level, etc.

Alternatively, color calibration information can be provided in some other way. For example, an NFC or RFID chip, a black and white bar code, or a black and white QR code may be used to encode product information, and a separate color calibration target (e.g., a gray card or color checker chart affixed to the product or packaging) may be included to provide color calibration information. As an example, a separate color calibration target may be positioned near a graphical code (e.g., above, below, or to the left or right of the graphical code) such that a single image capture operation can be used to capture an image of the color calibration target and the graphical code at the same time.

Referring again to FIG. 2, the client application 260 may use image preprocessing to identify the image data as containing the graphical code 132. The image data is then provided to a code reader 272, which extracts information from the graphical code 132. In the example shown in FIG. 2, the extracted information includes product information. Extracted product information may include a product ID, color, effect/shine (e.g., mat, soft, satin, glossy, metallic), finish (e.g., long-lasting, powdery, velvety), coverage (e.g., light, medium, full), color intensity, texture (e.g., gloss, creamy, liquid, wax, powder, lacquer), pearl size (e.g., small, medium, large), pearl density (e.g., high, medium, low), pearl color (e.g., silver, gold, rose), metallic effect (e.g., silver, blue, black, gold), reflection properties, metallic particles, ingredients, batch information, etc. In the case of a color OR code having embedded color calibration information (such as the example shown in FIG. 3), the extracted information also may include color calibration information. In this situation, the code reader 272 can provide the color calibration information to an image adjustment determination engine 274, which can then determine whether the camera 250 is accurately capturing those colors, or whether some adjustments to image capture parameters (e.g., white balance, exposure settings, color temperature, etc.) in the camera settings 252 or adjustments to environmental conditions (e.g., lighting, location of the object being photographed, etc.) may be needed. If adjustments to image capture parameters are needed, the image adjustment determination engine 274 may automatically make one or more corresponding adjustments to the camera settings 252, or prompt the user to make those adjustments via the user interface 276. If adjustments to environmental conditions are needed, the image adjustment determination engine 274 may cause the user interface 276 to prompt the user to make those adjustments.

Once any determined adjustments are made, the user can capture an image of the product itself (e.g., lipstick, lip gloss, etc.). This process can be repeated as many times as may be practical or desirable to obtain the desired level of accuracy.

The product image data can then be sent along with product information (and potentially other information, such as a user ID, device ID, or the like) to a communication module 278 for subsequent formatting and transmission to the backend product computer system 102. (Other features of the client computing device 104 are not shown in FIG. 2 for ease of illustration. A description of illustrative computing devices is provided below with reference to FIG. 5.)

In an embodiment, the user interface 276 provides virtual "try on" functionality that allows the consumer to virtually apply the actual characteristics of that product, e.g., to an image of the consumer's face. This functionality also may provide the ability to virtually try on variations in the product (e.g., different finishes, textures, tints, etc.) or provide variations in rendering of the virtual try-on images. Product information and image data transmitted to the backend computer system 102 can be used to perform anonymous analytics to, e.g., monitor consumer satisfaction or changes in the end product over time after manufacturing. Product information transmitted to the backend product computer system 102 may include the extracted product information, either alone or in combination with other information such as user preferences or selected variations for a particular product, which may be obtained via the user interface 276. Analytics (e.g., in combination with machine learning processes) can help to improve future procurement and manufacturing processes as well as to provide customers with desirable products in terms of customized tints, textures, or other features.

In one illustrative scenario, the client computing device 104 establishes communication with the backend product computer system 102 before capturing the images. For example, the client computing device 104 may establish communication with the backend product computer system 102 in response to launching the client application 260, or in response to navigating to a URL associated with the backend product computer system 102 via a web browser. Alternatively, the client computing device 104 may establish communication with the backend product computer system 102 after capturing an image of a code. For example, the code may include an encoded URL associated with the backend product computer system 102, or encoded instructions to download (e.g., from a website or an application marketplace) an application that allows the client computing device 104 to establish communication with the backend product computer system 102. In this scenario, the code reader may cause the mobile computing device to navigate to the URL or download the client application 260.

Within components of the system 100, or by components of the system 100 working in combination, numerous technical benefits are achieved. For example, the ability to adjust image capture parameters and/or environmental conditions to capture accurate images of the actual product overcomes the previous limitations of inaccurate images or visual inspections, or inaccurate assumptions about the expected characteristics (e.g., color, texture, etc.) of the product. As yet another example, the system 100 allows some aspects of the process to be conducted independently by the client computing device 104, such as adjusting image capture parameters to account for lighting and other environmental conditions in the location where the images of the product will be captured. Additional benefits may be realized by moving other processing burdens to the backend product computer system 102 (which may be a relatively high-powered and reliable computing system) from the client computing device 104, thus improving performance and preserving battery life for functionality provided by the client computing device 104.

In general, the word "engine," as used herein, refers to logic embodied in hardware or software instructions, which can be written in a programming language, such as C, C++, COBOL, JAVA™, PHP, Perl, HTML, CSS, JavaScript, VBScript, ASPX, Microsoft .NET™, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine or the functionality thereof.

As understood by one of ordinary skill in the art, a "data store" as described herein may be any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, as described further below. One of ordinary skill in the art will recognize that separate data stores described herein may be combined into a single data store, and/or a single data store described herein may be separated into multiple data stores, without departing from the scope of the present disclosure.

Figure 4:
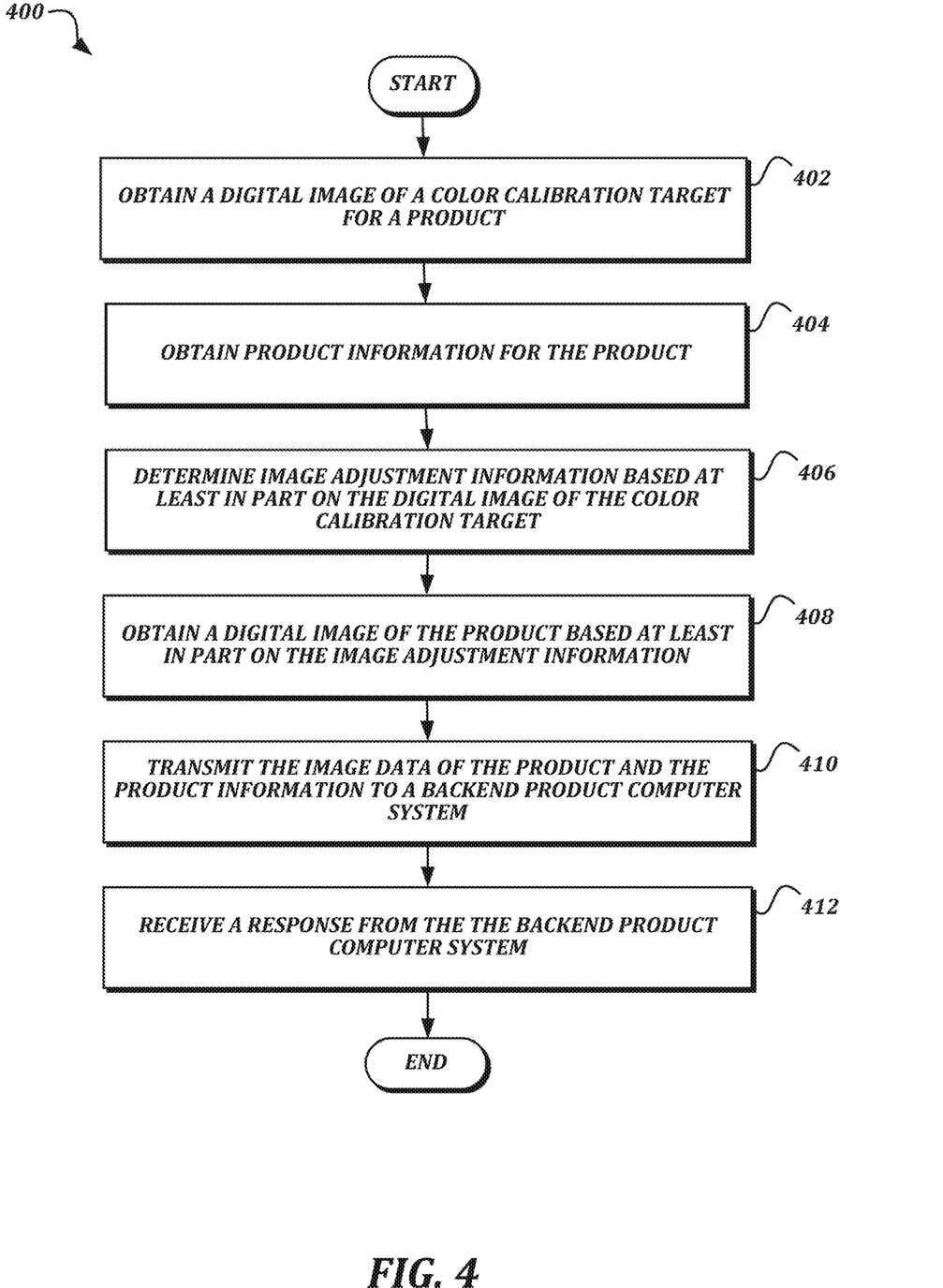
FIG. 4 is a flowchart that illustrates an example embodiment of a method of obtaining customized product information in response to color calibrated product images according to various aspects of the present disclosure.

FIG. 4 is a flowchart that illustrates an example embodiment of a method of obtaining customized product information in response to color calibrated product images according to various aspects of the present disclosure. Though some embodiments of the method 400 may be used with any type of product, some embodiments of the method 400 are particularly suitable for cosmetics products as described herein.

From a start block, the method 400 proceeds to block 402, where a client computing device (e.g., a mobile computing device comprising a camera) obtains a digital image of a color calibration target for a product. The method proceeds to block 404, where the client computing device obtains product information (e.g., product ID, batch characterization information, etc.) for the product. In some embodiments, the color calibration target may be integrated with a graphical code, such as a QR code having three or more colors as described herein, such that the steps of blocks 402 and 404 are performed in a process of capturing an image of and extracting information from the QR code, as described above. In other embodiments, obtaining the product information for the product comprises obtaining information from the product via some other graphical code, or via short-range radio-frequency communication (e.g., NFC or RFID communication).

The method proceeds to block 406, where the client computing device determines image adjustment information based at least in part on the digital image of the color calibration target. For example, the client computing device may compare captured pixel values with expected pixel values at predetermined locations in color regions of a QR code or color checker chart. The client computing device may automatically adjust camera settings such as white balance, exposure settings, color temperature, or the like based on the image of the color calibration target (e.g., in response to the comparisons described above), without further user intervention. One example of a technical benefit of this approach is that the camera settings are adjusted for the specific purpose of photographing the specific product in its specific environmental conditions, thereby promoting a more accurate capture of the colors of the actual product.

The method proceeds to block 408, where the client computing device obtains a digital image of the product (e.g., lipstick, lip gloss, etc.) based at least in part on the image adjustment information. This step may include, for example, capturing the digital image of the product using adjusted image capture parameters as described above. The method proceeds to block 410, where the client computing device transmits the image data of the product and the product information to a backend product computer system. The method proceeds to block 412, where the client computing device receives a response from the backend product computer system.

The method 500 then proceeds to an end block and terminates.

Figure 5:
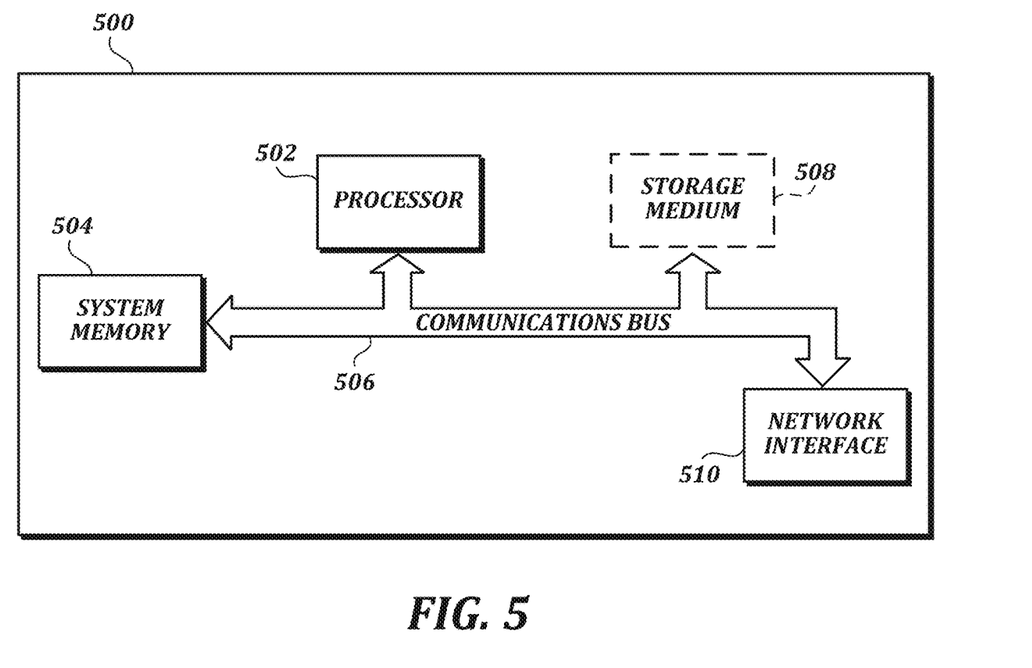
FIG. 5 is a block diagram that illustrates aspects of an exemplary computing device appropriate for use with embodiments of the present disclosure.

FIG. 5 is a block diagram that illustrates aspects of an exemplary computing device 500 appropriate for use with embodiments of the present disclosure. While FIG. 5 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 500 may be any one of any number of currently available or yet to be developed devices.

In its most basic configuration, the computing device 500 includes at least one processor 502 and a system memory 504 connected by a communication bus 506. Depending on the exact configuration and type of device, the system memory 504 may be volatile or nonvolatile memory, such as read only memory ("ROM"), random access memory ("RAM"), EEPROM, flash memory, or similar memory technology. Those of ordinary skill in the art and others will recognize that system memory 504 typically stores data and/or program modules that are immediately accessible to and/or currently being operated on by the processor 502. In this regard, the processor 502 may serve as a computational center of the computing device 500 by supporting the execution of instructions.

As further illustrated in FIG. 5, the computing device 500 may include a network interface 510 comprising one or more components for communicating with other devices over a network. Embodiments of the present disclosure may access basic services that utilize the network interface 510 to perform communications using common network protocols. The network interface 510 may also include a wireless network interface configured to communicate via one or more wireless communication protocols, such as WiFi, 2G, 3G, LTE, WiMAX, Bluetooth, and/or the like.

In the exemplary embodiment depicted in FIG. 5, the computing device 500 also includes a storage medium 508. However, services may be accessed using a computing device that does not include means for persisting data to a local storage medium. Therefore, the storage medium 508 depicted in FIG. 5 is represented with a dashed line to indicate that the storage medium 508 is optional. In any event, the storage medium 508 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 504 and storage medium 508 depicted in FIG. 5 are merely examples of computer-readable media. In an embodiment, computer-readable media can be used to store data for use by programs.

Suitable implementations of computing devices that include a processor 502, system memory 504, communication bus 506, storage medium 508, and network interface 510 are known and commercially available. For ease of illustration and because it is not important for an understanding of the claimed subject matter, FIG. 5 does not show some of the typical components of many computing devices. In this regard, the computing device 500 may include input devices, such as a keyboard, keypad, mouse, microphone, touch input device, touch screen, tablet, and/or the like. Such input devices may be coupled to the computing device 500 by wired or wireless connections including RF, infrared, serial, parallel, Bluetooth, USB, or other suitable connections protocols using wireless or physical connections. Similarly, the computing device 500 may also include output devices such as a display, speakers, printer, etc. Since these devices are well known in the art, they are not illustrated or described further herein.

While illustrative embodiments have been illustrated and described, it will be appreciated that various changes can be made therein without departing from the spirit and scope of the invention.

The invention claimed is:

1. A computer-implemented method, comprising:
  obtaining, by a computing device, a digital image of a color calibration target on a cosmetics product;
  obtaining, by the computing device, product information for the cosmetics product;
  extracting pixel values from the digital image at predetermined locations of the color calibration target on the cosmetics product;
  obtaining expected pixel values for the predetermined locations;
  determining, by the computing device, image adjustment information based at least in part on comparisons of the extracted pixel values from the digital image at the predetermined locations of the color calibration target with the expected pixel values for the predetermined locations;
  obtaining, by the computing device, a digital image of the cosmetics product based at least in part on the image adjustment information; and
  transmitting, by the computing device, image data obtained from the digital image of the cosmetics product and the product information to a backend product computer system.

2. The method of claim 1, wherein the color calibration target comprises a QR code having three or more color regions within the QR code.

3. The method of claim 2, wherein obtaining the product information for the cosmetics product comprises extracting the product information from the QR code.

4. The method of claim 3, wherein the predetermined locations of the color calibration target include one or more locations in the color regions within the QR code, and wherein determining the image adjustment information comprises adjusting one or more image capture parameters based on the comparisons.

5. The method of claim 1, wherein obtaining the digital image of the cosmetics product based at least in part on the image adjustment information includes:
  adjusting, by the computing device, one or more image capture parameters based at least in part on the image adjustment information;
  capturing, by the computing device, the digital image of the cosmetics product using the adjusted image capture parameters.

6. The method of claim 1, wherein the product information includes batch characterization information for the cosmetics product.

7. The method of claim 1, further comprising receiving a response from the backend product computer system, wherein the response includes additional product information.

8. The method of claim 1, wherein the color calibration target comprises a color checker chart or gray card.

9. The method of claim 1, wherein obtaining the product information for the product comprises scanning a graphical code.

10. The method of claim 9, wherein the graphical code comprises a QR code or a bar code.

11. The method of claim 1, wherein obtaining the product information for the cosmetics product comprises obtaining information from the cosmetics product via short-range radio-frequency communication.

12. A computing device comprising a camera, at least one processor and computer-readable media having stored thereon instructions configured to cause the computing device to:
 obtain a digital image of a color calibration target on a cosmetics product;
 obtain product information for the cosmetics product;
 extract pixel values from the digital image at predetermined locations of the color calibration target on the cosmetics product;
 obtain expected pixel values for the predetermined locations;
 determine image adjustment information based at least in part on comparisons of the extracted pixel values from the digital image at the predetermined locations of the color calibration target with the expected pixel values for the predetermined locations;
 obtain a digital image of the cosmetics product based at least in part on the image adjustment information, including automatically adjusting one or more camera settings based at least in part on the image adjustment information, and capturing the digital image of the cosmetics product with the camera using the one or more adjusted camera settings;
 transmit image data obtained from the digital image of the cosmetics product and the product information to a backend product computer system; and
 receive a response from the backend product computer system.

13. The computing device of claim 12, wherein the color calibration target comprises a QR code having three or more color regions, wherein obtaining the product information for the cosmetics product comprises extracting the product information from the QR code.

14. The computing device of claim 13, wherein the predetermined locations of the color calibration target include one or more locations in the color regions within the QR code, and wherein determining the image adjustment information comprises adjusting one or more image capture parameters based on the comparisons.

15. The computing device of claim 12, wherein the computing device comprises a mobile computing device.

16. The computing device of claim 12, wherein the color calibration target comprises a color checker chart or gray card.

17. The computing device of claim 12, wherein obtaining the product information for the product comprises scanning a graphical code.

18. The computing device of claim 12 further comprising an near-field communication (NFC) or radio-frequency identification (RFID) reader, and wherein obtaining the product information for the product comprises obtaining information from an NFC or RFID chip.

19. A non-transitory computer-readable medium having stored thereon instructions configured to cause a computing device to:
 obtain a digital image of a color calibration target on a cosmetics product;
 extract pixel values from the digital image at predetermined locations of the color calibration target on the cosmetics product;
 obtain expected pixel values for the predetermined locations;
 automatically determine image adjustment information based at least in part on comparisons of the extracted pixel values from the digital image at the predetermined locations of the color calibration target on the cosmetics product with the expected pixel values for the predetermined locations; and
 automatically generate one or more prompts to adjust image capture parameters via a user interface responsive to the determining of the image adjustment information.

20. The non-transitory computer-readable medium of claim 19, wherein the instructions are further configured to cause the computing device to automatically adjust one or more image capture parameters on a camera based on the image adjustment information.

21. The non-transitory computer-readable medium of claim 19, wherein the image capture parameters include white balance, an exposure setting, or color temperature, or a combination thereof.

* * * * *